(12) United States Patent
Venditti et al.

(10) Patent No.: US 9,218,233 B2
(45) Date of Patent: Dec. 22, 2015

(54) SYSTEMS AND METHODS FOR CONTROL RELIABILITY OPERATIONS

(76) Inventors: Paul Venditti, Clifton Park, NY (US); Ramesh Pai Brahmavar, Hyderabad (IN); Ayush Srivastava, Hyderabad (IN); Michael Scott Skalyo, Greenville, SC (US); Kevin Thomas McCarthy, Troy, NY (US)

( * ) Notice: Subject to any disclaimer, the term of this patent is extended or adjusted under 35 U.S.C. 154(b) by 615 days.

(21) Appl. No.: 13/557,083

(22) Filed: Jul. 24, 2012

(65) Prior Publication Data

US 2014/0031957 A1  Jan. 30, 2014

(51) Int. Cl.
G06F 11/07 (2006.01)
G05B 23/02 (2006.01)
G06N 5/02 (2006.01)
G06F 11/00 (2006.01)

(52) U.S. Cl.
CPC ........ *G06F 11/0769* (2013.01); *G05B 23/0216* (2013.01); *G06F 11/008* (2013.01); *G06F 11/0709* (2013.01); *G06F 11/0751* (2013.01)

(58) Field of Classification Search
None
See application file for complete search history.

(56) References Cited

U.S. PATENT DOCUMENTS

| | | | |
|---|---|---|---|
| 4,051,669 A | 10/1977 | Yannone et al. | |
| 4,642,782 A | 2/1987 | Kemper et al. | |
| 4,649,515 A | 3/1987 | Thompson et al. | |
| 5,508,897 A | 4/1996 | Van Order | |
| 5,634,008 A | 5/1997 | Gaffaney et al. | |
| 6,188,962 B1 | 2/2001 | Morgan et al. | |
| 6,199,018 B1 | 3/2001 | Quist et al. | |
| 6,268,853 B1 | 7/2001 | Hoskins et al. | |
| 6,556,950 B1 | 4/2003 | Schwenke et al. | |
| 6,615,090 B1 | 9/2003 | Blevins et al. | |
| 6,618,856 B2 | 9/2003 | Coburn et al. | |
| 6,633,782 B1 | 10/2003 | Schleiss et al. | |
| 6,654,915 B1 | 11/2003 | Lu et al. | |
| 6,671,659 B2 | 12/2003 | Troia et al. | |
| 6,738,683 B1 | 5/2004 | Dunn | |
| 6,862,553 B2 | 3/2005 | Schwenke et al. | |
| 6,990,432 B1 | 1/2006 | McCarthy, IV et al. | |
| 6,993,456 B2 | 1/2006 | Brooks et al. | |
| 7,089,452 B2 | 8/2006 | Rubin et al. | |
| 7,092,771 B2 | 8/2006 | Retlich et al. | |
| 7,146,232 B2 | 12/2006 | Staron et al. | |
| 7,162,695 B2 | 1/2007 | Zemore et al. | |

(Continued)

FOREIGN PATENT DOCUMENTS

FR  2947080 A1  12/2010
WO  01/50387 A1  7/2001

OTHER PUBLICATIONS

Speedtronic Mark VI Turbine Control System, 2000.*

(Continued)

*Primary Examiner* — Jeffrey A Gaffin
*Assistant Examiner* — Mikayla Chubb
(74) *Attorney, Agent, or Firm* — Fletcher Yoder, P.C.

(57) ABSTRACT

In one embodiment, a system includes a data collection system configured to collect a data from a control system. The system further includes a configuration management system configured to manage a hardware configuration and a software configuration for the control system based on the data. The system additionally includes a rule engine configured to use the data as input and to output a health assessment by using a rule database, and a report generator configured to provide a health assessment for the control system.

19 Claims, 4 Drawing Sheets

(56) References Cited

U.S. PATENT DOCUMENTS

| | | | |
|---|---|---|---|
| 7,213,065 | B2 | 5/2007 | Watt |
| 7,228,187 | B2 | 6/2007 | Tichy et al. |
| 7,266,476 | B2 | 9/2007 | Coburn et al. |
| 7,305,272 | B2 | 12/2007 | Maturana et al. |
| 7,324,856 | B1 | 1/2008 | Bromley |
| 7,395,188 | B1 * | 7/2008 | Goebel et al. ............... 702/184 |
| 7,451,351 | B2 | 11/2008 | Gunnmarker et al. |
| 7,546,232 | B2 | 6/2009 | Brooks et al. |
| 7,640,291 | B2 | 12/2009 | Maturana et al. |
| 7,702,487 | B2 | 4/2010 | Sherrill et al. |
| 7,729,886 | B2 | 6/2010 | Sherrill et al. |
| 7,729,887 | B2 | 6/2010 | Sherrill et al. |
| 7,797,141 | B2 | 9/2010 | O'Connell et al. |
| 7,840,336 | B2 | 11/2010 | Muramatsu et al. |
| 7,953,844 | B2 | 5/2011 | Deshpande |
| 8,250,914 | B2 | 8/2012 | Sullivan |
| 8,260,441 | B2 | 9/2012 | Scheegabeta et al. |
| 8,437,904 | B2 * | 5/2013 | Mansouri et al. ............ 701/29.1 |
| 2002/0066054 | A1 | 5/2002 | Jaw et al. |
| 2002/0077849 | A1 | 6/2002 | Baruch et al. |
| 2002/0120921 | A1 | 8/2002 | Corburn et al. |
| 2002/0169734 | A1 | 11/2002 | Giel et al. |
| 2003/0126202 | A1 | 7/2003 | Watt |
| 2003/0182083 | A1 | 9/2003 | Schwenke et al. |
| 2003/0231200 | A1 | 12/2003 | Zemore et al. |
| 2004/0073404 | A1 | 4/2004 | Brooks et al. |
| 2004/0098148 | A1 | 5/2004 | Retlich et al. |
| 2004/0204772 | A1 | 10/2004 | Maturana et al. |
| 2004/0205412 | A1 | 10/2004 | Staron et al. |
| 2004/0250168 | A1 | 12/2004 | Tichy et al. |
| 2004/0268186 | A1 | 12/2004 | Maturana et al. |
| 2005/0015680 | A1 | 1/2005 | Rubin et al. |
| 2005/0278670 | A1 | 12/2005 | Brooks et al. |
| 2006/0026035 | A1 | 2/2006 | Younkes et al. |
| 2007/0078628 | A1 | 4/2007 | Virji et al. |
| 2007/0088570 | A1 * | 4/2007 | Shetty et al. ..................... 705/2 |
| 2008/0141072 | A1 | 6/2008 | Kalgren et al. |
| 2009/0106589 | A1 * | 4/2009 | Ramacher et al. ............. 714/25 |
| 2010/0082125 | A1 | 4/2010 | Pingel et al. |
| 2010/0146078 | A1 | 6/2010 | Wolff et al. |
| 2010/0146341 | A1 | 6/2010 | Chen et al. |
| 2010/0222900 | A1 | 9/2010 | Kakino et al. |
| 2011/0040577 | A1 | 2/2011 | Ward |
| 2011/0059427 | A1 | 3/2011 | Hans et al. |
| 2011/0071692 | A1 | 3/2011 | D'Amato et al. |
| 2012/0016607 | A1 | 1/2012 | Cottrell et al. |
| 2012/0126539 | A1 | 5/2012 | Jacob |
| 2012/0275899 | A1 | 11/2012 | Chandler |
| 2013/0332383 | A1 | 12/2013 | Anzai et al. |
| 2014/0025414 | A1 | 1/2014 | Worden et al. |

OTHER PUBLICATIONS

GE Industrial Systems GEI-100483A, Speedtronic™ Mark VI Turbine Control Product Description, pp. 1-22, Jan. 10, 2002.
Non-Final Rejection towards related U.S. Appl. No. 13/557,153 dated Jul. 1, 2014.
International Search Report and Written Opinion issued from PCT Application No. PCT/US2013/050478 dated Jun. 27, 2014.
International Search Report and Written Opinion issued from PCT Application No. PCT/US2013/045353 dated Oct. 2, 2013.
U.S. Appl. No. 13/557,136, filed Jul. 24, 2012, McCarthy et al.
U.S. Appl. No. 13/571,148, filed Jul. 24, 2012, McCarthy et al.
U.S. Appl. No. 13/557,153, filed Jul. 24, 2012, McCarthy et al.
U.S. Appl. No. 13/557,125, filed Jul. 24, 2012, Loganathan et al.
Khan F I et al: "Risk-based maintenance: a quantitative approach for maintenance/inspection scheduling and planning", Journal of Loss Prevention in the Process Industries, Elsevier, United Kingdom, vol. 16, No. 6, Oct. 20, 2013, pp. 561-573.
Search Report from PCT/US13/46491 dated Sep. 26, 2013.

* cited by examiner

SYSTEMS AND METHODS FOR CONTROL RELIABILITY OPERATIONS

BACKGROUND OF THE INVENTION

The subject matter disclosed herein relates to reliability operations, and more specifically, to controller reliability operations.

Control systems, including industrial control systems, may include a variety of components and subsystems participating in a process. For example, a controller may include one or more processors, I/O subsystems, a memory, and the like. The controller may be operatively coupled to a variety of systems and used, for example, to control an industrial process. However, control systems may be complex, including numerous interrelated components and subsystems. Accordingly, recognizing or predicting a reliability of control system operations may be difficult and time-consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a data collection system configured to collect a data from a control system. The system further includes a configuration management system configured to manage a hardware configuration and a software configuration for the control system based on the data. The system additionally includes a rule engine configured to use the data as input and to output a health assessment by using a rule database, and a report generator configured to provide a health assessment for the control system.

In a second embodiment, a method includes acquiring a data related to a control system. The method additionally includes analyzing the data to obtain a data analysis by using a plurality of health assessment rules. The method further includes deriving a control system health assessment based on the data analysis, and providing the control system health assessment, wherein the control system health assessment is configured to derive an engineering opportunity for the control system.

In a third embodiment, a system includes a non-transitory machine readable medium comprising code configured to acquire a data related to a control system, and to analyze the acquired data to obtain a data analysis. The code is further configured to derive a control system health assessment based on the data analysis, and to derive an engineering opportunity for the control system based on the control system health assessment.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
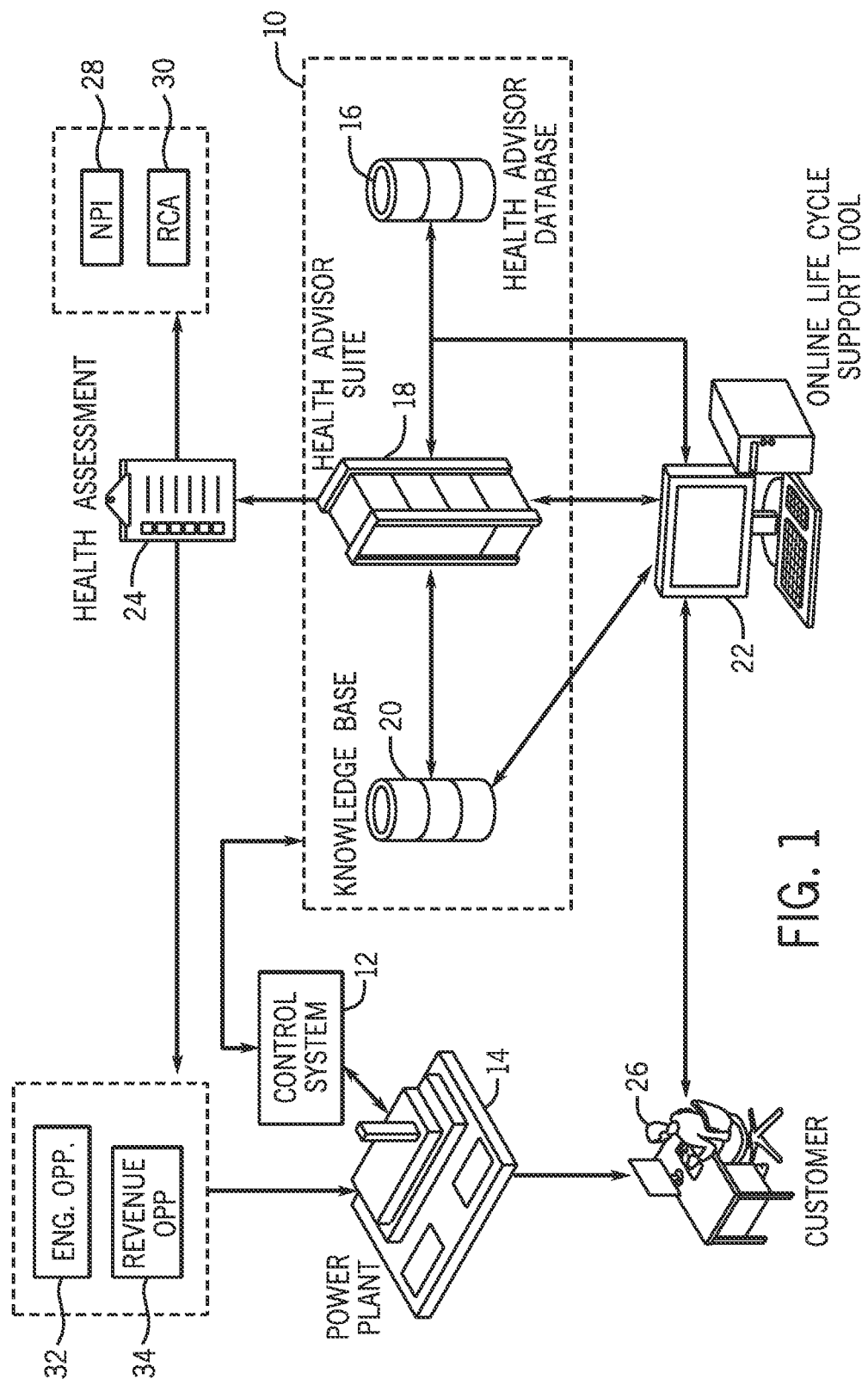
FIG. 1 is an information flow diagram of an embodiment of a control system health advisor communicatively coupled to plant including a control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, control of operations for an industrial process and associated machinery may be provided by a control system. In these embodiments, the control system may be implemented as a combination of hardware and software components suitable for receiving inputs (e.g., process inputs), processing the inputs, and deriving certain control actions useful in controlling a machinery or process, such as a power generation process, as described in more detail blow. However, the control system may not be as reliable, for example, due to older hardware and software.

Certain corrective maintenance (CM) techniques may be used, useful in repairing or updating the controller after an unexpected maintenance event. However, because the CM techniques are typically applied after the unexpected event, the controlled process may be stopped until the control system is brought back to a desired operating condition. The novel techniques described herein, including prognostic health monitoring (PHM) techniques, may enable a preventative or predictive approach in which control system issues may be identified prior to their occurrence. Accordingly, maintenance actions, such as control system upgrades, part replacements, supply chain order placement, and the like, may be performed in advance, and the control system may be maintained in an operational status for a longer duration. Indeed, stoppages of the controlled process and associated machinery may be substantially minimized or eliminated.

In certain embodiments, a rule-based system may be included in a controller health advisor suite of tools, and used to analyze and derive a health assessment for the control system. The health assessment may include a controller readiness, controller recommendations (e.g., upgrade recommendations, parts replacement recommendations, parts ordering recommendations), a configuration report, early warning reports (e.g., early warning outage reports), and access based reports (e.g., role-based access reports). The health advisor suite may additionally include online and offline components, useful in performing the health assessment while the health advisor suite is communicatively coupled either directly to the control system, or coupled indirectly to the control system. Additionally, the health assessment may be provided in real-time or near real-time. The health assessment may be derived continuously and used to update or improve the control system, thus providing for an up-to-date prognosis of the health of the control system.

With the foregoing in mind and turning now to FIG. 1, the figure is an information flow diagram illustrating an embodiment of a controller health advisor system 10 that may be communicatively coupled to a control system 12. The health advisor system 10 may include non-transitory code or instructions stored in a machine-readable medium and used by a computing device (e.g., computer, tablet, laptop, notebook, cell phone, personal digital assistant) to implement the techniques disclosed herein. The control system 12 may be used, for example, in controlling a power plant 14. The power plant 14 may be any type of power producing plant 14, and may include turbomachinery, such as a gas turbine, a steam turbine, a wind turbine, a hydroturbine, a pump, and/or a compressor. It is to be noted that, in certain embodiments, the control system 12 may be used to control a variety of other machinery, and may be disposed in any industrial plant (e.g., manufacturing plant, chemical plant, oil refining plant). Further, the control system 12 may be used to control an industrial system including a gasification system, a turbine system, a gas treatment system, a power generation system, or a combination thereof.

The health advisor system 10 may include a health advisor database 16, a health advisor suite (e.g., suite of software and/or hardware tools) 18, and a knowledge base 20. The health advisor database 16 may store, for example, rule-based information detailing expert knowledge on the workings and possible configurations of the control system 12, as well as knowledge useful in making deductions or predictions on the health of the control system 12. For example, the health advisor database 16 may include expert system rules (e.g., forward chained expert system, backward chained expert system), regression models (e.g., linear regression, non-linear regression), fuzzy logic models (e.g., predictive fuzzy logic models), and other predictive models (e.g., Markov chain models, Bayesian models, support vector machine models) that may be used to predict the health, the configuration, and/or the probability of occurrence of undesired maintenance events (e.g., failure of a power supply, failure of a processor core, failure of an input/output [I/O] pack, insufficient memory, loose bus connection) related to the control system 12.

The knowledge base 20 may include one or more answers to control system 12 questions or issues, including answers relating to controller configurations, unexpected problems, known hardware or software issues, service updates, and/or user manuals. The health advisor suite 18 may update the knowledge base 20 based on new information, such as a control system health assessment 24. Additionally, an online life cycle support tool 22 is provided. The online life cycle support tool 22 may use the health advisor suite 18 and the knowledge base 20 to provide support to customers 26 of the power plant 14. For example, the customers 26 may connect to the online life cycle support tool 22 by using a web browser, a client terminal, a virtual private network (VPN) connection, and the like, and access the answers provided by the knowledge base 20, as well as the health advisor suite 18 and/or the health assessment 24, through the online life cycle support tool 22.

The online life cycle support tool 22 may similarly be used by other entities, such as a contract performance manager (CPM) tasked with administrating contractual services delivered to the plant 14, and/or a technical assistant (TA) tasked with providing information technology and/or other system support to the plant 14. For example, the plant 14 may be provided with contractual maintenance services (e.g., inspections, repairs, refurbishments, component replacements, component upgrades), service level agreements (SLAs), and the like, supported by the CPM and the TA.

The health assessment 24 may be used, for example, to enable a new product introduction (NPI) 28 and/or a root cause analysis (RCA) 30. For example, issues found in the health assessment 24 may aid in identifying issues related to the introduction (e.g., NPI 28) of a new hardware or software component for the control system 12, or the introduction of a newer version of the control system 12. The identified issues may then be used to derive the RCA 30. For example, the health advisor suite 18 may use techniques such as fault tree analysis, linear regression analysis, non-linear regression analysis, Markov modeling, reliability block diagrams (RBDs), risk graphs, and/or layer of protection analysis (LOPA). The RCA 30 may then be used to re-engineer or otherwise update the control system 12 to address any issues found.

The health assessment 24 and/or the knowledge base 20 may also be used to derive engineering opportunities 32 and revenue opportunities 34. For example, controller usage patterns (processor usage, memory usage, network usage, program logs), issues found, frequently asked questions, and the like, may be used to derive engineering changes for the control system 12. The engineering changes may include changing memory paging schemes, memory allocation algorithms, applying CPU optimizations (e.g., assigning process priorities, assigning thread priorities), applying programming optimization (e.g., identifying and rewriting program bottlenecks, using improved memory allocation, using processor-specific instructions), applying networking optimizations (e.g., changing transmit/receive rates, frame sizes, time-to-live (TTL) limits), and so on.

Revenue opportunities 34 may also be identified and acted on. For example, the health assessment 24 may detail certain upgrades to the control system 12 based on a desired cost or budget structure, suitable for improving the performance of the control system 12. Upgrades may include software and/or hardware updates, such as newer versions of a distributed control system (DCS), a manufacturing execution system (MES), a supervisor control and data acquisition (SCADA) system, a human machine interface (HMI) system, an input/output system (e.g., I/O pack), a memory, processors, a network interface, a power supply, and/or a communications bus. By using the heath advisor suite 18 to derive the health assessment 24, the techniques described herein may enable a more efficient and safe power plant 14, as well as minimize operating costs.

Figure 2:
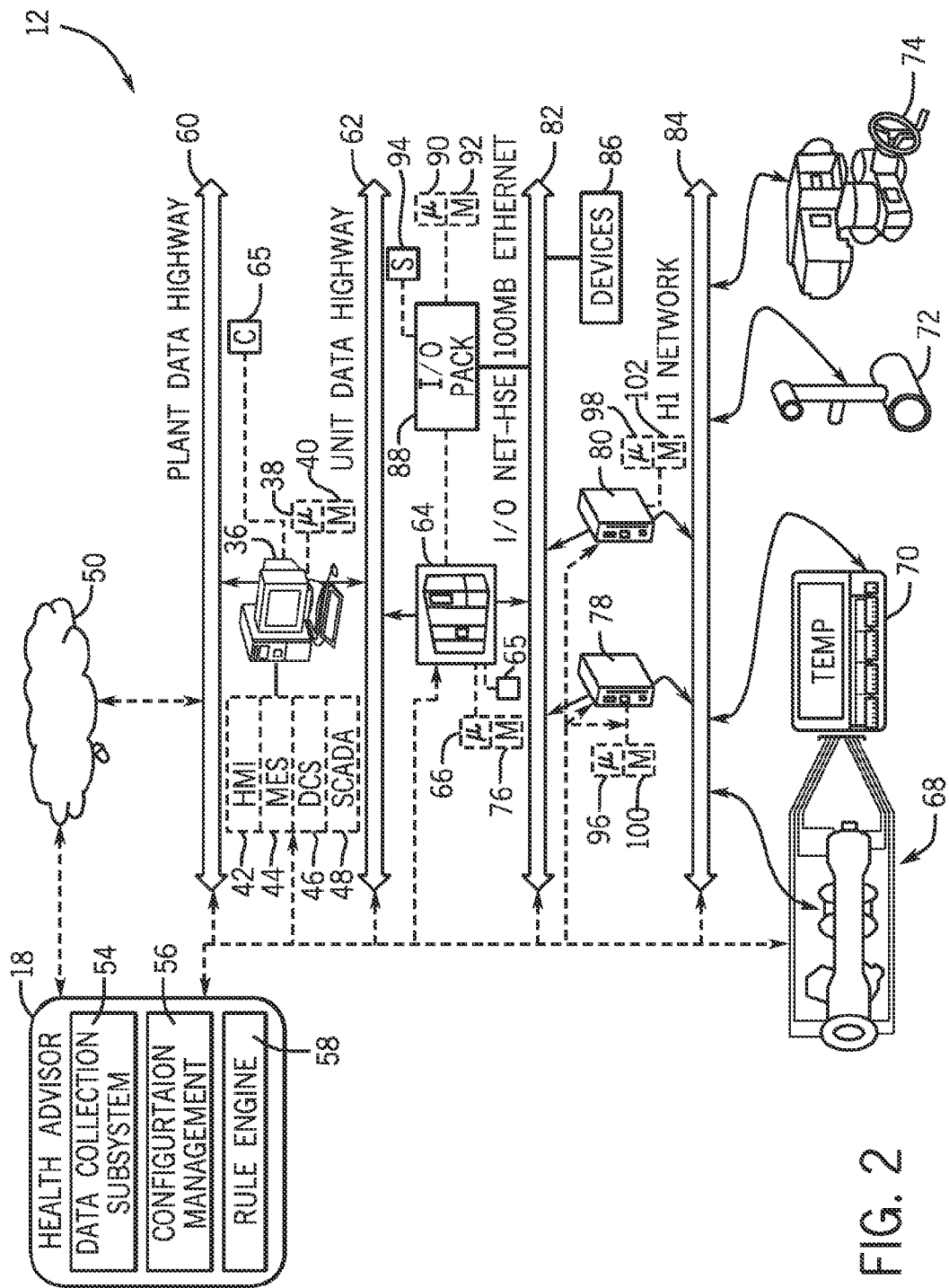
FIG. 2 is a schematic diagram of an embodiment of the control system health advisor of FIG. 1 communicatively coupled to a control system.

FIG. 2 is a schematic diagram depicting an embodiment of the control system 12 communicatively coupled to the health advisor suite 18. The control system 12 may include a computer system 36 suitable for executing a variety of control and monitoring applications, and for providing an operator interface through which an engineer or technician may monitor the components of the control system 12. Accordingly, the computer 36 includes a processor 38 that may be used in processing computer instructions, and a memory 40 that may be used to store computer instructions and other data. The computer system 36 may include any type of computing device suitable for running software applications, such as a laptop, a workstation, a tablet computer, or a handheld portable device (e.g., personal digital assistant or cell phone). Indeed, the computer system 36 may include any of a variety of hardware and/or operating system platforms. In accordance with one embodiment, the computer 36 may host an industrial control software, such as a human-machine interface (HMI) software 42, a manufacturing execution system (MES) 44, a distributed control system (DCS) 46, and/or a supervisor control and data acquisition (SCADA) system 48. The HMI 42, MES 44, DCS 46, and/or SCADA 50 may be stored as executable code instructions stored on non-transitory tangible computer readable media, such as the memory 40 of the computer 36. For example, the computer 36 may host the ControlST™ and/or ToolboxST™ software, available from General Electric Co., of Schenectady, N.Y.

The health advisor 18 may be communicatively coupled to the computer system 36 through direct or indirect techniques. For example, a signal conduit (e.g., cable, wireless router) may be used to directly couple the health advisor 18 to the computer 38. Likewise, a file transfer mechanism (e.g., remote desktop protocol (rdp), file transfer protocol (ftp), manual transfer) may be used to indirectly send or to receive data, such as files. Further, cloud 50 computing techniques may be used, where the health advisor 18 resides in the cloud 50 and communicates directly or indirectly with the computer system 36.

The health advisor suite 18 may include a data collection subsystem 54, a configuration management system 56, and a rule engine 60. In certain embodiments, the data collection subsystem 54 may collect and store data, such as data representative of the status, health, and operating condition of the control system 12. The data collection subsystem 54 may be continuously operating, and may include relational databases, network databases, files, and so on, useful in storing and updating stored data. The configuration management system 56 may be used to manage the various configurations of software and/or hardware components used in constructing the control system 12. Indeed, the control system 12 may include multiple software and/or hardware components, each component having one or more versions. These versioned components may be packaged by a manufacturer into the control system 12 as part of a contract services agreement, and/or may be provided as part of a transactional services agreement (e.g., purchased individually). The rule engine 58 may be used to enable the derivations of the health assessment 24, as described in more detail below with respect to FIGS. 3 and 4.

Further, the computer system 36 and the health advisor 18 may be communicatively connected to a plant data highway 60 suitable for enabling communication between the depicted computer 36 and other computers 36 and/or health advisors 18. Indeed, the industrial control system 12 may include multiple computer systems 36 interconnected through the plant data highway 60, or through other data buses (e.g., local area networks, wide area networks). In the depicted embodiment, the computer system 36 and the health advisor 18 may be further communicatively connected to a unit data highway 62, suitable for communicatively coupling the computer system 36 and the health advisor 18 to an industrial controller system 64. In other embodiments, other data buses (e.g., direct cabling, local area networks, wide area networks) may be used to couple the computer system 36 and the health advisor 18 to the industrial controller 64.

In one embodiment, the industrial controller 64 may include a processor 66 suitable for executing computer instructions or control logic useful in automating a variety of plant equipment, such as a turbine system 68, a temperature sensor 70, a valve 72, and a pump 74. The industrial controller 64 may further include a memory 76 for use in storing, for example, control code (e.g., computer instructions and other data). For example, the controller 64 may store one or more function blocks written in a International Electrotechnical Commission (IEC) 61804 language standard, sequential function charts (SFC), ladder logic, or programs written in other programming languages, in the control code. In one embodiment, the control code may be included in a configuration file 65. Additionally or alternatively, the configuration file 6 may include configuration parameter for the controller, such as instantiated function blocks (e.g., function blocks to load into memory), networking parameters, code synchronization and timing, I/O configuration, amount of memory to use, memory allocation parameters (e.g., memory paging parameters) and so on.

In another embodiment, the controller 64 may be a redundant controller suitable for providing failover or redundant operations. In this embodiment, the controller 64 may include three cores (or separate controllers), R, S, T, and may be referred to as may be referred to as a Triple Module Redundant (TMR) controller 64. The cores R, S, T may "vote" to determine the next action (e.g., step) to take in the control logic, based on the state information of each core R, S, T. The majority vote determines the selected action. For example, in using a state-voting algorithm, two of the controllers, e.g., controllers R and T, having the same state may "outvote" a third controller, e.g., controller S, having a different state. In this manner, the controller 64 system may rely on the majority of cores as providing a more reliable state (and action) for the system being monitored and controlled.

The industrial controller 64 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 64 may be a triple modular redundant (TMR) Mark™ VIe controller system, available from General Electric Co., of Schenectady, N.Y. By including three processors, the TMR controller 64 may provide for redundant or fault-tolerant operations. In other embodiments, the controller 64 may include a single processor, or dual processors.

In the depicted embodiment, the turbine system 68, the temperature sensor 70, the valve 72, and the pump 74 are communicatively connected to the industrial controller 64 and/or the health advisor 18 by using linking devices 78 and 80 suitable for interfacing between an I/O network 82 and an H1 network 84. For example, the linking devices 78 and 80 may include the FG-100 linking device, available from Softing AG, of Haar, Germany. Additional field devices 86 (e.g., sensors, pumps, valves, actuators) may be communicatively coupled via the I/O network 82 to the controller 64 and/or the health advisor 18, for example, by using one or more input/output (I/O) packs 88. The I/O packs 88 may each include a microprocessor 90 useful in executing a real-time operating system, such as QNX® available from QNX Software Systems/Research in Motion (RIM) of Waterloo, Ontario, Canada. Each I/O pack 88 may also include a memory 92 for storing computing instructions and other data, as well as one or more sensors 94, such as temperature sensors, useful in monitoring the ambient temperature in the I/O packs 88. In other embodiments, the turbine system 68, the temperature sensor 70, the valve 72, the pump 74, and/or the field devices 86, may be connected to the controller 64 and/or the health advisor 18 by using direct cabling (e.g., via a terminal block) or indirect means (e.g., file transfers).

As depicted, the linking devices 78 and 80 may include processors 96 and 98, respectively, useful in executing computer instructions, and may also include memory 100 and 102, useful in storing computer instructions and other data. In some embodiments, the I/O network 82 may be a 100 Megabit (MB) high speed Ethernet (HSE) network, and the H1 network 84 may be a 31.25 kilobit/second network. Accordingly, data transmitted and received through the I/O network 82 may in turn be transmitted and received by the H1 network 84. That is, the linking devices 78 and 80 may act as bridges between the I/O network 82 and the H1 network 84. For example, higher speed data on the I/O network 82 may be buffered, and then transmitted at suitable speed on the H1 network 84. Accordingly, a variety of field devices may be linked to the industrial controller 64, to the computer 36, and/or to the health advisor 18. For example, the field devices 68, 70, 72, and 74 may include or may be industrial devices, such as Fieldbus Foundation™ devices that include support for the Foundation H1 bi-directional communications protocol. The field devices 68, 70, 72, 74, and 86 may also include support for other communication protocols, such as those found in the HART® Communications Foundation (HCF) protocol, and the Profibus Nutzer Organization e.V. (PNO) protocol.

Figure 3:
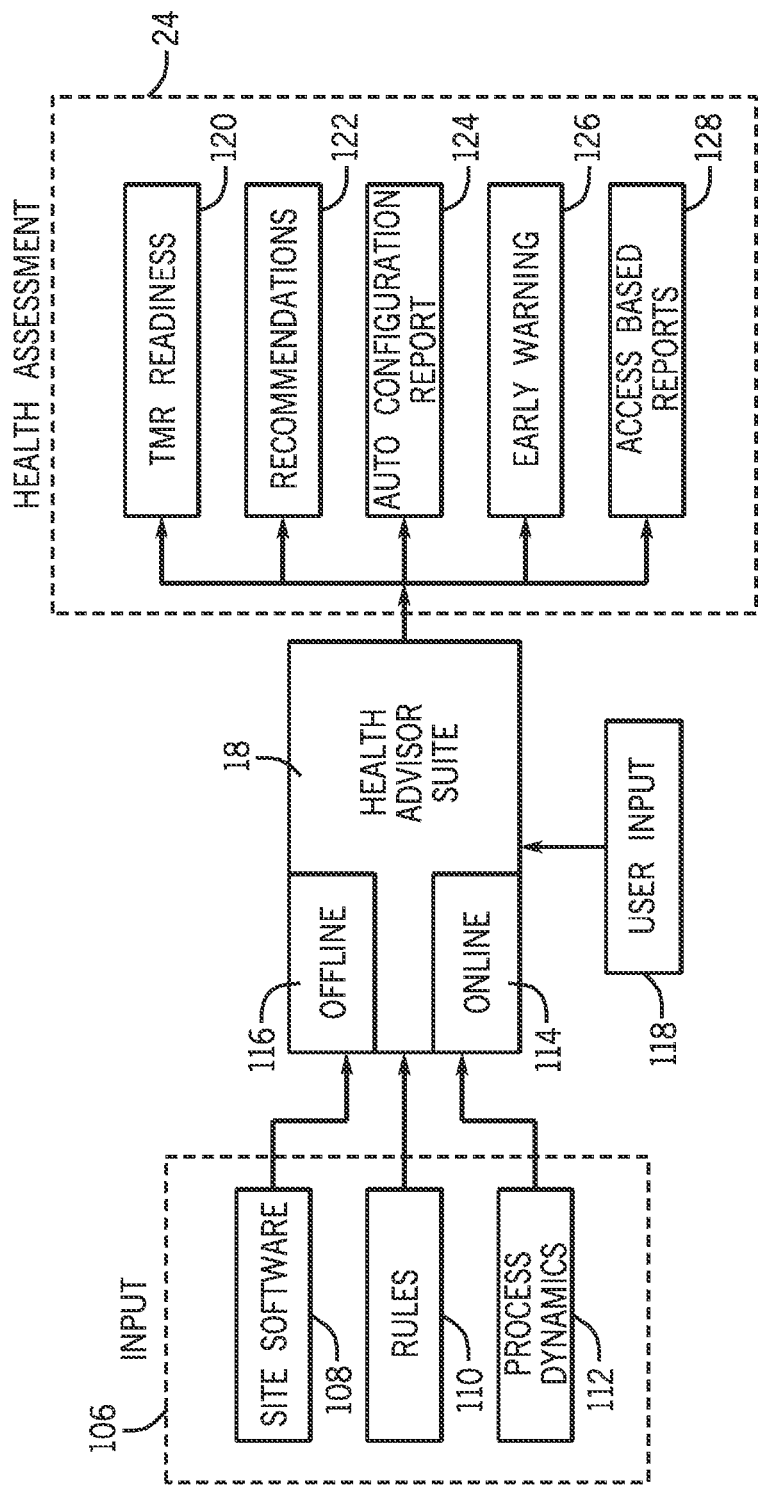
FIG. 3 is a block diagram of an embodiment of the control system health advisor of FIG. 1.

FIG. 3 is a block diagram of an embodiment of the health advisor suite 18 depicting the transformation of inputs 106 into the health assessment 24. By using the inputs 106 to derive the health assessment 24, the health advisor suite 18 may enable an up-to-date prognosis of the health of the control system 12, and may be used to derive the NPI 28, the RCA 30, the engineering opportunities 32, and/or the revenue opportunities 34 for the plant 14. As mentioned above, the health advisor suite 18 may include computer instructions stored in a non-transitory machine readable medium, such as the memory of a computer, a tablet, a notebook, a workstation, a cell phone, and/or other computing device. In the depicted embodiment, the inputs 106 may include site software 108, rules 110, and/or process dynamics 112.

The site software 108 may include all software (e.g., software tools, operating systems, networking software, firmware, microcode, display drivers, sound drivers, network drivers, I/O system drivers) used by the components of the control system 12 of FIG. 2, such as the HMI 42, the MES 44, the DCS 46, the computer 36, the controller 64, the linking devices 78, 80, the I/O pack 88, the plant data highway 60, the I/O network 82, the H1 network 84, and the field devices 68, 70, 72, 74, 86.

The rules 110 may include "if . . . then . . ." rules with the "if" portion set as an antecedent condition, and the "then" portion set as a consequent of the antecedent condition. The rules may also include fuzzy logic rules, expert system rules (e.g., forward chained expert systems, backward chained expert systems), recursive rules (e.g., Prolog rules), Bayesian inference rules, dynamic logic rules (e.g., modal logic), neural network rules, genetic algorithm rules, or a combination thereof. The rules may be derived through consultation with one or more experts in the field, such as a controller system health experts, or automatically, such as by using machine learning techniques (e.g., reinforcement learning, decision tree learning, inductive logic programming, neural network training, clustering, support vector machine).

The process dynamics 112 may include data received when the health advisor 18 is communicatively coupled to the control system 12. The process dynamics 112 data may include alerts issued by the controller 64, and/or the HMI 42, the MES 44, the DCS 46, the SCADA 48. Likewise, the process dynamics 112 may include utilization data (e.g., percent utilization, total utilization) for the memories 40, 76, 92, 100, 102, utilization data for the processors 38, 66, 90, 96, 98 (e.g., utilization by software processes, utilization by software applications), current configuration parameters used by the components of the control system 12 (e.g., memory page size, virtual memory pages, thread priority, process priority) controller 64 parameters (e.g., master/slave configuration, I/O parameter), bus 60, 62, and 84 parameters, I/O pack 88 parameters, linking device 78, 80 parameters, field device 68, 70, 72, 74, 86 parameters.

In the depicted embodiment, the health advisor suite 18 includes online 114 and offline 116 operational modes, which may be used alone or in combination with each other. In the online mode 114 of operations, the health advisor may be constantly receiving the inputs 106, for example, by using the data collection subsystem 54 of the health advisor suite 18, then processing the inputs 106, for example, by using the configuration management 56 and rule engine 58 of the health advisor suite 18, to produce the health assessment 24. In the offline mode 116 of operations, the inputs 106 may be provided, for example, as a set of files or as a "batch job." That is, the files or "batch job" may be provided to the data collection subsystem 54 as pre-collected data, which may be subsequently used to produce the health assessment 24. By providing for the offline mode 116, the health advisor suite 18 may be used, for example, in a computing device that may be disconnected from the controller system 12. User input 118 is also depicted. The user input 118 may include data related to the control system 12 and manually entered by the user. Additionally, the user input 118 may include usage input (e.g., keyboard, mouse, voice) directing the health advisor 18 to perform certain desired operations, such as operations deriving the health assessment 18, including a TMR readiness report 120, a recommendation report 122, an auto configuration report 124, early warnings 126, and/or access-based reports 128.

The TMR readiness report 120 may detail the condition of the TMR controller 64, including any detected fault conditions, alarm reports based on alarm logging data, error reports based on error logging data, and may also derive an overall readiness metric by using the inputs 106. For example, the readiness metric may detail an approximate percentage readiness (0%-100%) for the overall control system 12, as well as for each component of the control system 12. A higher number for the percentage readiness may indicate that the control system 12 (or component) is more suitable for continued operations, while a lower number for the percentage readiness may indicate that the control system 12 (or component) is less suitable for continued operations. The percentage readiness may be derived by using certain of the rules 110 focused on determining the overall operational health of the control system 12 (or component). The percentage readiness may also be found by using a statistical or historical analysis based on the inputs, such as a Poisson distribution model, linear regression analysis, non-linear regression analysis, Weibull analysis, fault tree analysis, Markov chain modeling, and so on.

The recommendation report 122 may include recommendations on improvements for the control system 12. For example, certain hardware and software upgrades or additions may be recommended. The hardware upgrades may include memory upgrades, network equipment upgrades, processor upgrades, replacement of components of the control system 12, replacement of cabling, replacement of power supplies, and so on. The recommendations may also include adding certain component and related subsystems, for example to enable faster control and/or faster processing of data. The software recommendations may include upgrading or replacing the software components of the control system 12 (e.g., HMI 42, MES, 44, DCS 46, SCADA 48), operating systems, software tools, firmware, microcode, applications, and so on.

The auto configuration report 124 may include details of the configuration of the control system 12. The configuration details may include a list of all software and hardware components used by the control system 12, including details of the components 36, 38, 40, 42, 44, 46, 48, 50, 60, 62, 64, 66, 68, 70, 72, 74, 76, 78, 80, 82, 84, 86, 88, 90, 92, 94, 96, 98, 100, and/or 102. The details may include the number of each of the aforementioned components used by the control system 12, version information for each components (hardware version, firmware version, software version, microcode version), interconnections between component (e.g., network diagram, electronic circuit diagrams, information flow diagrams, programming flowcharts, database diagrams), procurement information (cost, delivery times, supplier information).

The early warning report 126 may include a list of issues that may lead to undesired conditions, such as unexpected maintenance events or stoppage of the control system 12. For example, the early warning report 126 may include issues such as insufficient memory 40, 76, 92, 100, 102, loss of redundancy of the controller 64, low bandwidth capacity of the buses 60, 62, 84, insufficient processing power for the processors 38, 66, 90, 96, 98, failure of any of the components 36, 38, 40, 42, 44, 46, 48, 50, 60, 62, 64, 66, 68, 70, 72, 74, 76, 78, 80, 82, 84, 86, 88, 90, 92, 94, 96, 98, 100, and 102, software errors, hardware errors, and so on.

The access based reports 128 may be reports accessible by certain roles, such as system administrators, plant operators, commissioning engineers, managers, programmers, control engineers, procurement personnel, accounting personnel, and so on, and useful in performing the jobs associated with the aforementioned roles. In one embodiment, the access based reports 128 may be based on the data used in the reports 120, 122, 124, and/or 126 focused on the desired role. For example, a control engineer role may receive a report 128 based on all of the data used in the reports 120, 122, 124, and 126, while a procurement based report 128 may distil the data and present data relevant to procurement activities (e.g., manufacturing information, cost information, delivery time information). In this manner, data from the reports 120, 122, 124, and 126 may be distilled and used to more efficiently support roles such as system administrators, plant operators, commissioning engineers, managers, programmers, control engineers, procurement personnel, accounting personnel.

Figure 4:
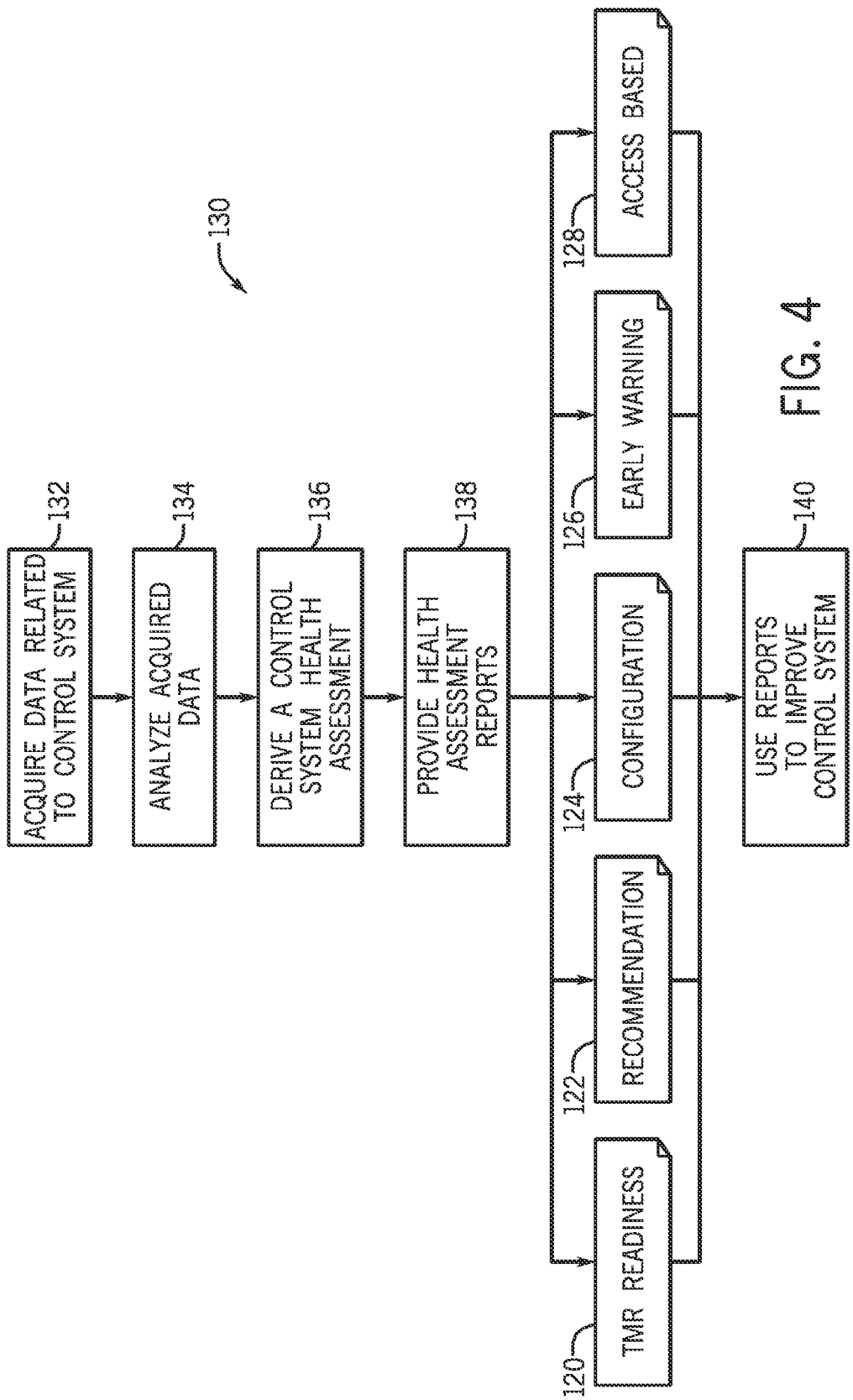
FIG. 4 is a flowchart of an embodiment of a process useful in deriving a health assessment for a control system.

FIG. 4 is flowchart of an embodiment of a process 130 useful in analyzing the control system 12 and deriving the health assessment 24. The process 130 may be implemented by using computer instructions stored in a non-transitory machine-readable medium, such as the memory of a computer, a laptop, a notebook, a tablet, a cell phone, and/or a personal digital assistant (PDA). By analyzing the inputs 106 and deriving the health assessment 24 (e.g., TRM readiness 120, recommendations 122, auto configuration report 124, early warnings 126, access bases reports 128), the process 130 may enable a more efficient, reliable, and safe control system 12.

The process 130 may acquire data (block 132), such as the inputs 106, related to the control system 12. As previously mentioned, the data may be acquired directly (e.g., through a cable or other conduit), or indirectly (e.g., through files loaded onto a storage medium, such as a CD, DVD, flash card, thumb drive). The acquired data may then be analyzed (block 134). For example, the health assessment suite 18 may use the rule engine 58 and rules 110 to analyze the data. Other techniques including statistical and historical analysis techniques may also be used, such as fault tree analysis, linear regression analysis, non-linear regression analysis, Markov modeling, RBDs, risk graphs, LOPA, Poisson distribution model, Weibull analysis, and/or Markov chain modeling.

The process 130 may then derive (block 136) the control system health assessment 24, for example, by using the control system health assessment suite 18 as described above. The health assessment 24 may then be provided (block 138), to the control system 12 operator and/or manufacturer and to user roles (e.g., system administrators, plant operators, commissioning engineers, managers, programmers, control engineers, procurement personnel, accounting personnel), as well as stored in, for example, the knowledge base 20 accessible by the online life cycle support tool 22. As mentioned previously, the health assessment report may include the TRM readiness report 120, the recommendation report 122, the auto configuration report 124, the early warning report 126, and the access based report 128.

The process 130 may then use the provided reports 120, 122, 124, 126, and/or 128 to improve (block 140) the control system 12 and/or the plant 14. For example, components of the control system 12 may be replaced, added, or upgraded. Likewise, NPI 28 and RCA 30, engineering opportunities 32 and/or revenue opportunities 34 may be derived and used to more efficiently and safely operate the control system 12 and/or plant 14.

Technical effects of the invention include the online and offline gathering of control system information. The gathered control system information may then be used to derive a control system health assessment, for example, by using a rule engine communicatively coupled to a health assessment database. The rules in the rule engine may be edited by using a rule editor. The health assessment may include a triple modular redundant (TMR) readiness report, a controller recommendation, an auto configuration report, an early warning report, an access based report, or a combination thereof, suitable for improving and/or optimizing the control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a processor configured to execute:
a data collection system configured to collect a data from a control system, wherein the control system comprises a controller configured to provide for control operations for the control system;
a configuration management system configured to manage a hardware configuration and a software configuration for the control system based on the data;
a rule engine configured to use the data as input and to output a health assessment by using a rule database; and
a report generator configured to provide a health assessment for the control system, wherein the health assessment comprises a first and a second readiness metric, wherein the first readiness metric comprises a first percentage readiness representative of a readiness of the control system to provide control system operations, and wherein the second readiness metric comprises a second percentage readiness representative of a readiness of the controller to provide for controller operations.

2. The system of claim 1, wherein the controller comprises a Triple Module Redundant (TMR) controller having an R core, an S core, and a T core, wherein the TMR controller is configured to provide for redundant control operations for the control system, and wherein the second readiness metric comprises an R core percentage readiness, an S core percentage readiness, and a T core percentage readiness.

3. The system of claim 1, wherein the data comprises a configuration file configured to be stored in the controller, and wherein the configuration file comprises a control code, controller parameters, or a combination thereof.

4. The system of claim 3, wherein the control code comprises a ladder logic, a sequential function chart (SFC), function blocks, or a combination thereof.

5. The system of claim 1, wherein the data collection system is configured to provide an offline collection of the data.

6. The system of claim 1, wherein the data collection system is configured to provide an online collection of the data, and wherein the data comprises data used or generated by a controller configured to provide for control operations for the control system.

7. The system of claim 1, wherein the rule database comprises a plurality of health assessment "if . . . then" rules, and wherein the rule engine is configured to use the plurality of health assessment "if . . . then" rules to output the health assessment.

8. The system of claim 1, comprising an online life cycle support tool configured to use the health assessment to update a knowledge base, and wherein the knowledge base comprises a plurality of answers to customer questions related to the health of the control system.

9. The system of claim 1, wherein the health assessment comprises a TMR readiness report, a controller recommendation, a configuration report, an early warning report, an access-based report, or a combination thereof.

10. The system of claim 1 comprising a power generation system having the control system.

11. A method comprising:
acquiring a data related to a control system, wherein the control system comprises a controller configured to provide for control operations for the control system;
analyzing the data to obtain a data analysis by using a plurality of health assessment rules;
deriving a control system health assessment based on the data analysis; and
providing the control system health assessment, wherein the control system health assessment is configured to derive an engineering opportunity for the control system, and wherein the control system health assessment comprises a first and a second readiness metric, wherein the first readiness metric comprises a first percentage readiness representative of a readiness of the control system to provide control system operations, and wherein the second readiness metric comprises a second percentage readiness representative of a readiness of the controller to provide for controller operations.

12. The method of claim 11, wherein the health assessment comprises a triple modular redundant (TMR) readiness report, a controller recommendation, an auto configuration report, an early warning report, an access based report, or a combination thereof.

13. The system of claim 11, wherein acquiring the data comprises acquiring the data offline of the control system, acquiring the data online of the control system, or a combination thereof.

14. The system of claim 11, wherein the engineering opportunity comprises removing, updating, or replacing a hardware component or a software component of the control system.

15. A system comprising:
a non-transitory machine readable medium comprising code configured to:
acquire a data related to a control system, wherein the control system comprises a controller configured to provide for control operations for the control system;
analyze the data to obtain a data analysis;
derive a control system health assessment based on the data analysis; and
derive an engineering opportunity for the control system based on the control system health assessment, wherein the control system health assessment comprises a first and a second readiness metric, wherein the first readiness metric comprises a first percentage readiness representative of a readiness of the control system to provide control system operations, and wherein the second readiness metric comprises a second percentage readiness representative of a readiness of the controller to provide for controller operations.

16. The system of claim 15, wherein the non-transitory machine readable medium comprising code configured to analyze the data comprises code configured to use a controller health assessment rules database to analyze the data.

17. The system of claim 15, wherein the non-transitory machine readable medium comprises code configured to use a knowledge base database to provide a plurality of answers to customer questions related to a health of the control system.

18. The system of claim 15, wherein the non-transitory machine readable medium comprising code configured to derive the control system health assessment comprises code configured to derive a triple modular redundant (TMR) readiness report, derive a controller recommendation, derive an auto configuration report, derive an early warning report, derive an access based report, or a combination thereof.

19. The system of claim 15, comprising an industrial system having the non-transitory machine readable medium storing the code, wherein the industrial system comprises a gasification system, a turbine system, a gas treatment system, a power generation system, or a combination thereof.

* * * * *